Figure 1:
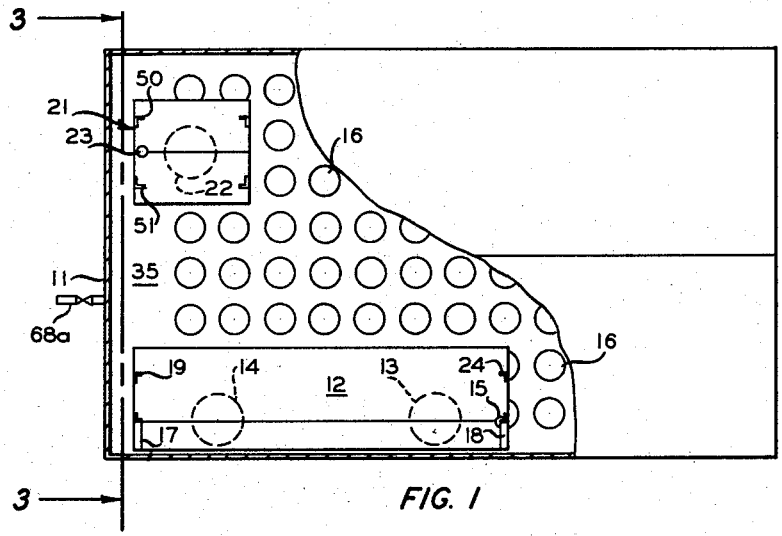

Jan. 19, 1965 L. C. KEATON 3,166,392
STACK CONDENSATE TRAY IN CARBON BLACK FILTER HOUSING
Filed Aug. 28, 1961 2 Sheets-Sheet 1

INVENTOR.
L. C. KEATON
BY *Hudson & Young*
ATTORNEYS

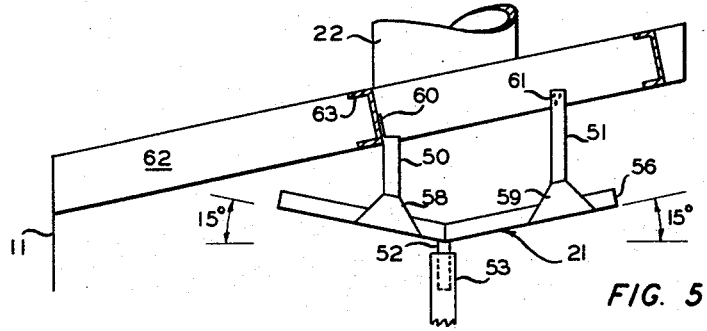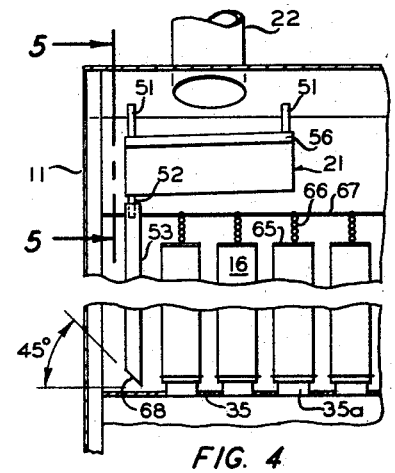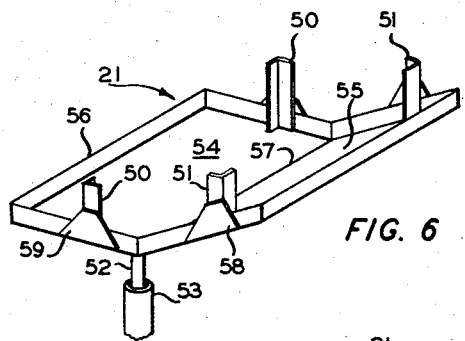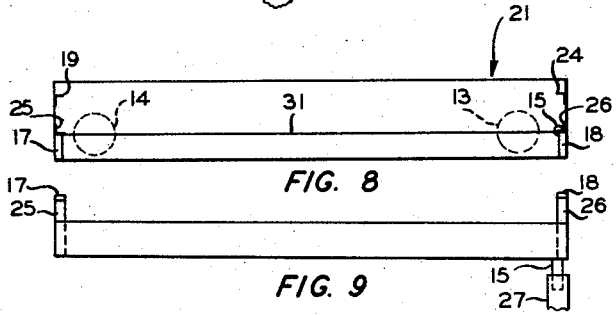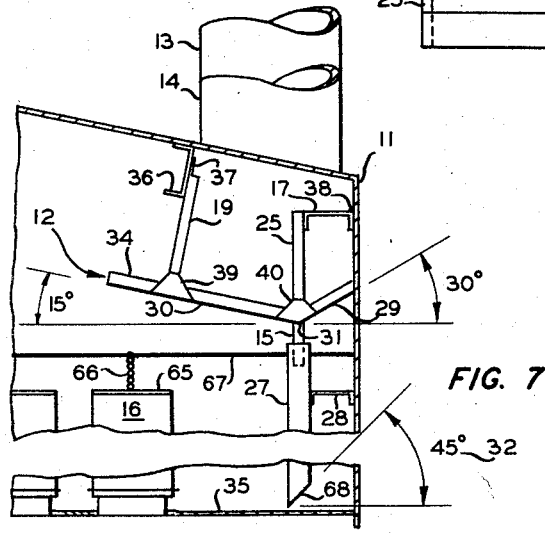

3,166,392
STACK CONDENSATE TRAY IN CARBON BLACK FILTER HOUSING
Lawrence C. Keaton, Borger, Tex., assignor to Phillips Petroleum Company, a corporation of Delaware
Filed Aug. 28, 1961, Ser. No. 134,420
2 Claims. (Cl. 55—280)

This invention relates to the separation of carbon black from gases containing carbon black in suspension. In one aspect it relates to the separation of carbon black from gases containing carbon black and moisture in bag filters. In another aspect it relates to means for lengthening the service life of filter bags used in the separation of carbon black from carbon black containing furnace gases by maintaining the bags dry during down time as well as on stream time.

In the art of producing carbon black in reactor furnaces, a hot gaseous effluent containing suspended carbon black is produced at temperatures generally in the neighborhood of about 1200° F., although at some points in the reactor during the carbon black producing process, temperatures as high as 2000° to 4000° F. may be attained. It is customary to cool the effluent gases containing the carbon black from the reactor furnaces to temperatures from about 280° to about 500° F., prior to separation of the black from the gases. Most of the cooling is by water spray. One means for separating carbon black from the furnace gases is to pass the gases through bag filters. Bag filters are quite efficient for separation of the black when compared to the older electrostatic separation processes. Furthermore, the use of bag filters permits separation of substantially all of the carbon black from the gases. Heretofore, bag filters were used for the most part for smoke abatement where the major portion of the carbon black was separated by the electrostatic process. However, more recently, the bag filters are employed for separating all of the black from the gases. The filter bags are ordinarily made of fabric of one type or another. Such fabrics as textiles, for example wool, and fabrics woven from synthetic fibers, such as Orlon, and most recently woven glass are used for filter bags. When using Orlon bags, a serious problem presents itself. The Orlon fibers require that the carbon black containing gases must be cooled to a temperature of at least 280° F. to prevent damage to the fibers. When using glass fabric bags, considerably higher temperatures can be tolerated. For example, glass fabric bags can be operated at temperatures from about 450° to as high at 600° F. However, ordinarily, such a maximum temperature is not employed.

For cooling the furnace effluent from its water quenched outlet temperature of about 1200° F., in some instances, the furnace effluent is passed through a long length of steel pipe which serves as an atmospheric cooler. Also, additional water is sprayed into the carbon black containing gases to expedite cooling thereof. In any event, the water spray near the outlet end of the furnace which reduces the temperature from reaction temperature to about 1200° F. and further addition of water by spraying to reduce the temperature to from about 450 to about 600° F. places considerable water vapor in the carbon black containing gases. The presence of these large quantities of moisture in the carbon black containing gases presents problems when employing bag filters for separation and recovery of the carbon black.

When bag filters are employed for separating all of the carbon black from the furnace gases, the bags frequently are operated on a time cycle basis. This type of operation is required because bags are ordinarily cylindrical in shape and the gases containing the black are introduced into the bottom open end of the bags and flow outward through the walls thereof. With limited diameters, after a bag is on stream for a length of time, the bag tends to fill with carbon black and the thicker the layer of carbon black on the inner surface of the filter bag wall the greater is the pressure drop through the layer of black on the wall. After deposition of a substantial layer of carbon black on the inner wall surface, the flow of gases and black is diverted and a black-free gas is forced or passed in reverse direction through the bag. The passage of a gas in this direction loosens the carbon black from the inner wall surface and allows the black to fall downward into hoppers placed below a bank of filter bags. For passing a gas backward through the filter bags, dampers in outlet pipes or stacks from the filter house are closed and hot filtered gases do not pass through these stacks. Under this condition, when the stack cools to the dew point of the gases, moisture from the gases can condense on the inner surface of the stack. When sufficient moisture condenses, the condensate runs downward and drips onto the top wall surfaces of the filter bags. Any portion of the filter bag which is wet does not properly operate as a filter. Furthermore, it was found that carbon black contacting a wet area of filter bag adheres to this wet area and on backflow of gases on the backflow portion of the cycle, carbon black is not properly removed from the filter bag. Also, it was found that drip condensate evaporated when the filter cell was placed in operation following a shutdown or backflow period, a hard crust formed on the bags. Crust was forming on the inner wall surface of the bag as well as on the outer wall surface. It was further found that this crust was at least in part ferrous sulfate. Obviously, carbon black should not contain such foreign material. During backflow cycles, various amounts of this crust broke off from the inner wall surface of the bags and was removed with the carbon black.

Also, bag wall areas, covered with such a crust, are inoperable as carbon black filters. After prolonged use of bags, the upper walls of the bags became inoperative and filter capacity was marketdly reduced. Upon inspection, ferrous sulfate crusts were found on the bags irrespective of the materials of which the bags were made. In one instance, fiber glass fabric bags were used and in another instance, woven Orlon fabric bags were used. Thus, in order to maintain maximum throughput of the filter cell arrangement, a bag which becomes undesirably coated or impregnated with such ferrous sulfate must be removed, discarded and replaced with a new filter bag. Such filter bags are quite expensive pieces of equipment. For this reason, means were searched for eliminating the ferrous sulfate problem.

Moisture from the carbon black containing gases can condense in one or more of the pipes or stacks at any time when the metal walls of the stacks are sufficiently cool. For instance, during down periods when the equipment is cool, or at atmospheric temperature, moisture from the furnace effluent can condense in the stacks. Atmospheric moisture also can condense in the stacks during the down periods. During startup periods when moisture laden furnace effluent gases reach the outlet stacks, which have not yet become heated, condensate can form. As mentioned hereinabove, such filter equipment usually operates on a time cycle basis and when a stack is not on stream, it can cool with possible condensate formation. Also when moisture laden gases are cyclically passed through this cool stack condensate can form. In other words, many conditions can exist in such a plant when condensate will form and require need for the invention.

An object of this invention is to devise apparatus for permitting filter bag separation of carbon black without experiencing the ferrous sulfate problem. Another object of this invention is to provide apparatus for preventing the dripping of condensate from pipes connected with the roof of the filter house upon the fabric filter bags. Yet another object of this invention is to provide apparatus for preventing contact of condensate water from pipes connected with the roof of the bag house with the filter bags. Still another object of this invention is to provide relatively simple, inexpensive and easy to install apparatus for carrying out these objects. Other objects and advantages of this invention will be realized upon reading the following description which, taken with the attached drawing, forms a part of this specification.

Figure 2:
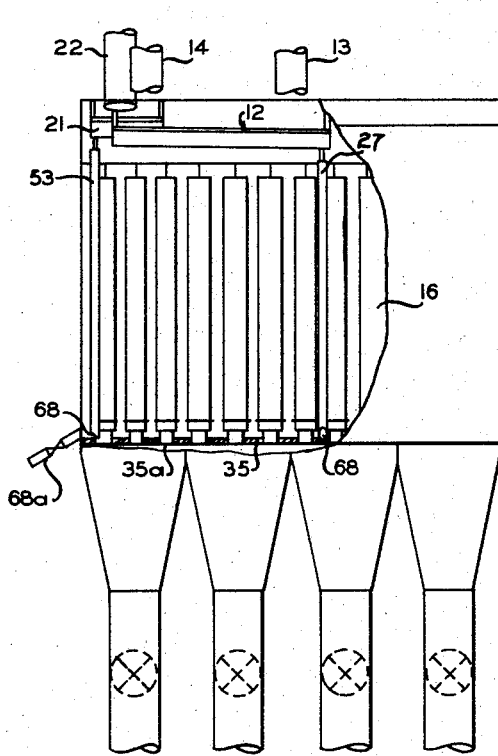
Figure 3:
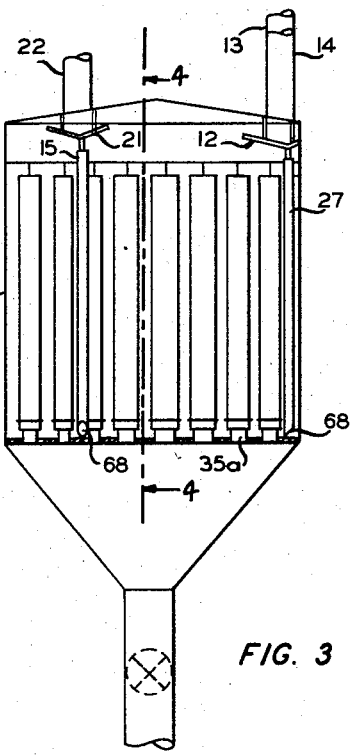

In the drawing, FIGURE 1 illustrates, in diagrammatic form, a plan view of a portion of a filter bag cell showing positioning of the apparatus of this invention. FIGURE 2 is a side elevational view with parts broken away of the apparatus of FIGURE 1. FIGURE 3 is a sectional view taken on the line 3—3 of FIGURE 1. FIGURE 4 is a view taken on the line 4—4 of FIGURE 3. FIGURE 5 is a view taken on the line 5—5 of FIGURE 4. FIGURE 6 is a view, in perspective, of an embodiment of the apparatus of this invention. FIGURE 7 is an end view of another portion of apparatus of this invention installed in a bag filter cell. FIGURE 8 is a plan view of the apparatus of this invention as illustrated in FIGURE 7. FIGURE 9 is a side elevational view of the apparatus of FIGURE 8.

In FIGURE 1 of the drawing, reference numeral 11 identifies a bag house in which is positioned a large number of filter bags 16. These bags are arranged as illustrated in FIGURE 1. This view of FIGURE 1 is a plan view of a portion of a bag house illustrating positioning of the apparatus of this invention in cooperation with exhaust stacks or other pipes connected with the roof of the building. An elongated drain tray 12 is positioned in horizontal arrangement with pipes 13 and 14. Pipe 13 is an exhaust stack pipe while pipe 14 is a repressuring inlet pipe. That is, a repressuring inlet pipe is a pipe through which gases from another filter cell building is introduced into this filter cell building for providing reverse flow through the filter bags for removing carbon black from the interior thereof. Still another drain tray 21 is positioned below a pipe 22. This pipe 22 is actually a repressuring suction outlet pipe This repressuring suction outlet pipe is employed for removal of gases from the upper portion of this filter house for repressuring an adjacent filter cell for removal of carbon black from the inside of the filter bag.

Details of construction of drain tray 12 are shown in FIGURES 7, 8 and 9. This drain tray is made of an elongated plate of stainless steel. This plate is bent along bend line 31 in such a manner that when installed, as illustrated in FIGURE 7, the narrow side 29 of the tray is positioned at an angle of about 30° from the horizontal while the wide side 30 of the tray is positioned at an angle of about 15° from the horizontal. A rim 34, about 2 inches in height, is attached to the outer edges of this drain tray 12 with the exception of the edge of the tray which is attached to the wall of the cell house. However, in some cases, it is desired to provide a 2 inch rim even on this latter side of the tray. As installed in a plant, the 2 inch rim was installed on all edges of the tray 12. As illustrated in FIGURE 7, an angle iron 19 was bolted to the rim 34 of the tray with the assistance of a conventional gusset plate 39. One leg of angle iron 19 was removed from the opposite end of the iron leaving a leg 37 for attachment to a channel iron purlin 36. This purlin was originally installed as one of the roof supports of the cell building. Another angle iron 25 is attached by a bolted gusset 40 to the rim 34 at the bend line 31 at the left hand end of the drain plate as illustrated in FIGURES 8 and 9. Since there is not a roof support member immediately above angle iron 25, a short length of a channel iron 17 is attached to the upper end of angle iron 25 and to the wall of the building as illustrated in FIGURE 7. The portion of this short length of angle iron which is attached to the building is provided with caulking 38 so that condensate water cannot be retained between the leg of the channel iron and the wall of the building. An angle iron 26 is similar to angle iron 25 but is positioned at the opposite end of the tray 12. This angle iron 26 is fastened to the wall of the building with a short length of channel iron 18 in the manner just explained relative to angle iron 25. Also, another angle iron 24 is attached at the right hand end of plate 12 and this latter angle iron corresponds to angle iron 19. Angle iron 24 is attached to the roof support channel 36 in a manner similar to that stated for angle iron 19.

However, in some cases, channel iron 17 is a long piece of channel iron and is a portion of the building framework. In this case, channel iron 17 extends along the wall illustrated for the entire length of the building.

This drain tray 12 is arranged in the building at a point somewhat above the top level of the filter bags 16. The tray is sloping from 1 to 2 inches in about 10 feet of length so that condensate water dripping on the tray will flow to the right hand end of the tray as illustrated in FIGURE 9. At the right hand end of the tray, at the bend line, is a drain spout 15 which directs accumulated water from the surface of the tray downward. This drain spout 15 extends into a drain pipe 27 which leads the water on downward to the top surface of a cell plate 35. This cell plate is substantially the floor of the upper portion of the cell house and the bottom ends of the filter bags 16 are attached to the walls of openings in the cell plate in such a manner that the gases containing carbon black to be filtered pass upward through these openings into the bags 16 for filtering. The upper ends of the bags 16 are provided with end closure members 65. These closure members are round so that the bags in all instances can be maintained in a fully cylindrical shape throughout their length. These closure members also support the weight of the filter bags and their load of carbon black and the closures are attached by chains 66 to a support member 67 which extends across the width of the building.

The drain pipe 27 is attached to a channel iron 28 as by welding and this channel iron is ordinarily one of the structural members of the building. The bottom end of the drain pipe 27 is beveled at 68 at about a 45° angle, with the lower tip of the bevel being about 1 inch off the top surface of the cell plate 35. This 45° angle is identified in FIGURE 7 by reference numeral 32.

In FIGURE 8, and in FIGURE 1, the exhaust stack 13 and the repressuring inlet pipe 14 are shown by broken lines because those pipes terminate at the roof line and do not extend into the cell house. They are merely shown in these figures for positioning with respect to the drain tray 12.

The repressuring suction pipe 22 is also shown in FIGURE 1 with a broken line and immediately under this pipe is positioned the drain tray 21 for collecting and disposal of condensate from this pipe. FIGURES 4 and 5 illustrate the side view and the end view installation, respectively, of this drain plate 21 under the repressuring suction outlet pipe 22. This tray is provided with a 2 inch wide rim 56 around the entire outer edge of the tray. Similar to tray 12, this tray 21 is made from a sheet or plate of stainless steel bent along its center to provide sloping sides of about 15 degrees as illustrated in FIGURE 5. Angle irons 51 are attached by bolted gussets 59 to the rim of this tray at opposite ends thereof at about the positions illustrated. Similarly, a pair of angle irons 50 are also attached by bolted gussets 58 to the rim of the tray at about the position illustrated. One leg of the angle irons 50 at the ends thereof opposite gussets 58 is removed and the remaining leg 60 is attached to the roof support channel irons 63 as illustrated. Reference numeral 62 identifies a rafter of the building. Angle irons 51 are attached as by bolting to the rafters 62 by bolts 61. This drain plate 21 of FIGURE 5 is illustrated in perspective in FIGURE 6. In FIGURE 6, the bend line of the plate is identified by reference numeral 57 with reference numerals 54 and 55 identifying opposite halves of the tray bottom. This tray 21 as illustrated in FIGURE 4 slopes downward to the left in such a manner that condensate dripping from pipe 22 will flow to the left and into a drain spout 52. This drain spout extends into the upper end of a drain pipe 53 which extends downward to without about 1 inch of the upper surface of the cell plate 35. The lower end of this drain pipe 53 is also beveled at an angle of approximately 45 degrees to provide an oval elliptical shape opening 68 at the discharge end of the pipe. The lowest point of this ellipse is approximately 1 inch above the cell plate. The oval or elliptical openings face the adjacent walls of the building so that liquid falling downward will splash toward the walls of the building rather than toward an adjacent filter bag.

It is preferred that trays 12 and 21 and the rims therearound along with the corresponding drain spouts be made of stainless steel because the condensate which drops onto these trays ordinarily contain appreciable amounts of carbon black. Water containing carbon black frequently is not neutral as regards acidity and in many cases the water may be alkaline. In other instances, if the feed to the carbon black producing reactors contain appreciable amounts of sulfur the condensate may be acid because of the absorption of acidic gases produced in the combustion of the sulfur containing compounds. In any event, the use of stainless steel for all elements in which this condensate water comes in contact makes this apparatus resistant against either acid or alkaline corrosion.

The drain plates when bent along their bend lines have substantially the form of wide angle V-plates, that is, the cross-section of the plates is of a wide angle V.

Such drain plates as disclosed herein have been used in carbon black bag filter sills for extended periods of time without the deterioration of the filter bags by condensate water containing metallic salts. Upon inspection of the fiberglass filter bags in such an installation, no evidence whatever was found indicating the presence of ferrous sulfate or even indicating that the upper ends of the close to the roof stock bags had ever been wet.

Various alterations and modifications of the apparatus disclosed herein can be made and yet remain within the intended spirit and scope of this invention. For example, the angles with the horizontal of each section of drain tray 21 obviously can be greater or less than the disclosed 15°. Likewise, the angles of the two sides of the drain tray 12 can vary somewhat from the disclosed angles of 15 degrees and 30 degrees. Also, other means can be utilized for supporting such drain trays from the roof of the building or from the side walls thereof.

It should be noted that the filter bags 16 are attached or slipped over the outer periphery of flanges 35a and clamps holding the bags firmly to these flanges. The lower ends of the bags are positioned two or three inches above the top surface of the cell plate 35 so that water which passes down the drain pipes 27 and 53 cannot contact the bags. In this manner inorganic salts, such as the hereinbefore mentioned ferrous sulfate cannot be deposited on the bags.

A valved drain pipe 68a is provided as illustrated in FIGURES 1 and 2 for withdrawal of accumulated water if and when necessary.

The stacks 22, 13, as well as other structural members of bag house 11, are constructed of conventional ferrous metals such as structural steels.

While certain embodiments of the invention have been described for illustrative purposes, the invention obviously is not limited thereto.

That which is claimed is:

1. A bag filter system for separating carbon black from gases containing carbon black in suspension comprising, in combination, an enclosure having a floor, enclosing sidewalls and a roof, a plurality of upright cylindrical filter bags in said enclosure, a plurality of openings in said floor, the lower end of each filter bag being open and operatively communicating with one of said plurality of openings in such a manner that gases containing carbon black in suspension upon passing upwardly through said openings enter said bags, means for introduction of gases containing carbon black in suspension into said openings and thence into said bags, the upper ends of said bags being closed and terminating at a level short of said roof, at least one vent pipe in said roof, a tray positioned directly below said pipe and above the top level of said bags, said tray being of greater lateral extent than that of said pipe and being a V-shaped sloping trough, a drain spout in operative communication with the lowermost portion of said tray in such a manner that liquid on said tray drains therefrom into said drain spout, and a conduit communicating operably with said drain spout and extending substantially to said floor.

2. A bag filter system for separating carbon black from gases containing carbon black in suspension comprising in combination, an enclosure having a floor, enclosing sidewalls and a roof, a plurality of upright filter bags in said enclosure, a plurality of openings in said floor, the lower open end of each filter bag communicating with one of said plurality of openings in such a manner that gases containing carbon black in suspension upon passing upwardly through said openings enter said bags, means for introduction of gases containing carbon black in suspension into said openings and thence into said bags, the upper ends of said bags being closed and terminating at a level below said roof, a vent pipe in said roof, a tray positioned directly below said pipe and above the top level of said bags, said tray being of greater lateral extent than said pipe and being a V-shaped sloping trough, a drain spout in operative communication with the lowermost portion of said tray in such a manner that liquid on said tray drains therefrom into said drain spout, and a conduit communicating operably with said drain spout and extending substantially to said floor, the tray being so positioned in said enclosure that said drain spout and conduit are intermediate a filter bag adjacent a sidewall and said sidewall, the lower end of said conduit terminating at an angle with the axis of said conduit in such a manner that said open end is an elliptical opening and said elliptical opening faces said sidewall.

References Cited in the file of this patent

UNITED STATES PATENTS

| | | |
|---|---|---|
| 2,130,930 | Rose | Sept. 20, 1938 |
| 2,238,543 | Trotter | Apr. 15, 1941 |
| 2,262,591 | Phillip | Nov. 11, 1941 |
| 2,717,658 | Bethea et al. | Sept. 13, 1955 |
| 2,863,525 | Lucian | Dec. 9, 1958 |
| 2,871,978 | Webster et al. | Feb. 3, 1959 |